(12) United States Patent
Roos et al.

(10) Patent No.: US 10,495,013 B2
(45) Date of Patent: Dec. 3, 2019

(54) CONTROL OF PREPARATORY MEASURES IN A VEHICLE

(71) Applicant: Scania CV AB, Södertälje (SE)

(72) Inventors: Fredrik Roos, Segeltorp (SE); Mikael Ögren, Norsborg (SE); Olof Larsson, Stockholm (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 15/320,962

(22) PCT Filed: Jun. 16, 2015

(86) PCT No.: PCT/SE2015/050700
§ 371 (c)(1),
(2) Date: Dec. 21, 2016

(87) PCT Pub. No.: WO2016/007072
PCT Pub. Date: Jan. 14, 2016

(65) Prior Publication Data
US 2017/0159593 A1   Jun. 8, 2017

(30) Foreign Application Priority Data
Jul. 7, 2014 (SE) ........................ 1450871

(51) Int. Cl.
*H02J 7/00* (2006.01)
*B60W 10/06* (2006.01)
(Continued)

(52) U.S. Cl.
CPC ........... *F02D 41/042* (2013.01); *B60W 10/06* (2013.01); *B60W 10/26* (2013.01); *B60W 10/30* (2013.01);
(Continued)

(58) Field of Classification Search
CPC .. F02D 41/042; F02D 41/26; F02D 2200/021; F02D 2200/702; H02J 7/0021;
(Continued)

(56) References Cited

U.S. PATENT DOCUMENTS 7,040,304 B2 * 5/2006 Kassner .............. F02D 41/0007
123/179.18
8,147,373 B2 * 4/2012 Soliman ................ B60W 10/02
477/3
(Continued)

FOREIGN PATENT DOCUMENTS

DE   102009045567 A1   4/2011
EP        2540589 A2   1/2013
(Continued)

OTHER PUBLICATIONS

International Search Report of the International Searching Authority for PCT/SE2015/050700 dated Nov. 2, 2016.
(Continued)

*Primary Examiner* — Nicholas Kiswanto
(74) *Attorney, Agent, or Firm* — Moore & Van Allen PLLC; W. Kevin Ransom

(57) ABSTRACT

The present invention presents a method and a system for the control of preparatory measures during a road section, for at least one system. First, one or several parts of a road section are identified, during which parts one or several engines comprised in the vehicle may be shut down. Such identification is carried out when the road section is ahead of the vehicle, that is to say before the vehicle has entered the road section. The identification is based on available information about the road section. Subsequently it is determined whether at least one preparatory measure for at least one respective system in the vehicle needs to be carried out, in order to facilitate that one or several of the engines may be shut down. Subsequently, the preparatory measures are
(Continued)

controlled based on the determination of the need to carry out the at least one preparatory measure.

17 Claims, 5 Drawing Sheets

(51) Int. Cl.
    *B60W 10/26*    (2006.01)
    *B60W 10/30*    (2006.01)
    *B60W 20/13*    (2016.01)
    *B60W 30/18*    (2012.01)
    *B60W 50/00*    (2006.01)
    *F02D 41/04*    (2006.01)
    *F02D 41/26*    (2006.01)

(52) U.S. Cl.
    CPC ...... *B60W 20/13* (2016.01); *B60W 30/18072* (2013.01); *B60W 50/0097* (2013.01); *F02D 41/26* (2013.01); *H02J 7/007* (2013.01); *H02J 7/0021* (2013.01); *B60W 2030/1809* (2013.01); *B60W 2550/142* (2013.01); *B60W 2550/143* (2013.01); *B60W 2550/402* (2013.01); *B60Y 2200/92* (2013.01); *F02D 2200/021* (2013.01); *F02D 2200/702* (2013.01); *Y10S 903/946* (2013.01)

(58) Field of Classification Search
    CPC ... H02J 7/007; B60Y 2200/92; Y10S 903/946
    See application file for complete search history.

(56) References Cited

U.S. PATENT DOCUMENTS

| | | | | |
|---|---|---|---|---|
| 8,160,804 | B2* | 4/2012 | Chominsky | F02D 41/08 |
| | | | | 701/112 |
| 8,347,855 | B2* | 1/2013 | Schoenek | F02D 41/042 |
| | | | | 123/319 |
| 9,256,576 | B2* | 2/2016 | Gibson | B60G 99/00 |
| 9,393,954 | B2* | 7/2016 | Gibson | F02D 41/022 |
| 9,447,765 | B2* | 9/2016 | Rademacher | F02N 11/084 |
| 9,783,187 | B2* | 10/2017 | Khafagy | B60W 20/13 |
| 2006/0142915 | A1 | 6/2006 | Isono et al. | |
| 2007/0093954 | A1* | 4/2007 | Malone | F02D 41/22 |
| | | | | 701/112 |
| 2011/0136620 | A1 | 6/2011 | Gibson et al. | |
| 2012/0046841 | A1 | 2/2012 | Wurthner et al. | |
| 2012/0265427 | A1 | 10/2012 | Petridis et al. | |
| 2013/0096792 | A1 | 4/2013 | Maier et al. | |
| 2013/0190998 | A1 | 7/2013 | Polimeno et al. | |

FOREIGN PATENT DOCUMENTS

| | | |
|---|---|---|
| EP | 2679461 A1 | 1/2014 |
| EP | 2620339 A1 | 7/2014 |
| GB | 2508670 A | 6/2014 |
| KR | 1020060063776 A | 6/2006 |
| KR | 1020080053561 A | 6/2008 |
| KR | 1020120065979 A | 6/2012 |
| WO | 2010069440 A1 | 6/2010 |
| WO | 2012169960 A1 | 12/2012 |
| WO | 20120169961 A1 | 12/2012 |
| WO | 2014003654 A1 | 1/2014 |
| WO | 2014055016 A1 | 4/2014 |
| WO | 2014058383 A2 | 4/2014 |
| WO | 2014060825 A1 | 4/2014 |
| WO | 2014068719 A1 | 5/2014 |
| WO | 2014074050 A1 | 5/2014 |

OTHER PUBLICATIONS

Written Opinion of the International Searching Authority for PCT/SE2015/050700 dated Nov. 2, 2016.
Korean Office Action from the Korean Intellectual Property Office for Korean Patent Application 10-2017-7002622 dated Sep. 18, 2018.
Scania CV AB, Swedish Application No. 1450871-7, Office Action, dated Feb. 24, 2015.
Scania CV AB, International Application No. PCT/SE2015/050700, International Preliminary Report on Patentability, Aug. 17, 2016.

* cited by examiner

CONTROL OF PREPARATORY MEASURES IN A VEHICLE

CROSS-REFERENCE TO RELATED APPLICATION(S)

This application is a national stage application (filed under 35 § U.S.C. 371) of PCT/SE15/050700, filed Jun. 16, 2015 of the same title, which, in turn claims priority to Swedish Application No. 1450871-7, filed Jul. 7, 2014 of the same title; the contents of each of which are hereby incorporated by reference.

FIELD OF THE INVENTION

The present invention relates to methods, systems, and computer program products for control of preparatory measures during a road section.

BACKGROUND OF THE INVENTION

For motor vehicles, such as cars, trucks and buses, the cost of fuel constitutes a significant expense for the vehicle's owner or user. For a hauling company, for example, the main expenditure items for the day-to-day operation of a vehicle consist, apart from the cost of acquisition of the vehicle and the vehicle's driver's salary, of costs of repair and maintenance and fuel for the propulsion of the vehicle. The fuel cost may impact the profitability of the hauling company to a great extent. Therefore, a number of different systems have been developed to reduce fuel consumption, such as efficient engines and fuel economical cruise controls.

FIG. 1 schematically shows a powertrain in a vehicle 100. The powertrain comprises one or several engines, for example comprising a combustion engine 101 and/or an electric motor 121, which in a customary manner, via an output shaft 102 on the one or several engines 101, 121 usually via one or several flywheels, is connected to at least one input shaft 109 in a gearbox 103, via a clutch 106. The clutch 106 may e.g. consist of an automatically controlled clutch, and may be controlled by the vehicle's control system via a control device 130. The control device 130 may also control the gearbox 103.

The gearbox 103 is here illustrated schematically as one device. However, the gearbox 103 may also physically consist of several cooperating gearboxes, for example a so-called range gearbox, a main gearbox and a split gearbox, arranged along the vehicle's powertrain. The gearbox may comprise a suitable number of gears. Today's gearboxes for heavy goods vehicles usually have twelve forward gears, two reverse gears and one neutral gear. If the gearbox 103 consists, physically, of several part-gearboxes as described above, these twelve propulsive gears are distributed with two gears in the range gearbox, three gears in the main gearbox and two gears in the split gearbox, jointly constituting twelve gear positions (2*3*2=12). The vehicle 100 further comprises drive shafts 104, 105, which are connected to the vehicle's driving wheels 110, 111, and which are operated by an output shaft 107 from the gearbox 103, via a shaft gear 108, such as e.g. a customary differential.

The vehicle 100 further comprises various different braking systems, such as a customary braking system, which may comprise brake plates with associated brake pads (not shown) arranged next to each wheel. The vehicle 100 may also comprise one or several additional/auxiliary brakes, such as exhaust brakes, retarders or decompression brakes (not displayed). The engine 101 may be controlled based on instructions from a cruise control, in order to maintain a constant actual vehicle speed and/or to vary the actual vehicle speed, for example in such a manner that an optimized fuel consumption is obtained within reasonable speed limits. The engine 101 may also be controlled by a driver of the vehicle.

The vehicle may also comprise a system 140 for monitoring the status and charging of one or several batteries, which may be used, for example, at the start of the combustion engine 101 with the help of a starting engine, at operation of the engine, whereat the electric motor 121 is used to operate the vehicle, or for operation of one or several systems in the vehicle.

The vehicle may also comprise one or several systems using compressed air and/or hydraulic pressure, and therefore one or several compressors 150 may be comprised in the vehicle.

The vehicle may also comprise one or several devices 160 for temperature monitoring and/or temperature control. For example, the temperature of the one or several engines 101, 121, the temperatures for one catalyst in an exhaust purification device and/or the temperatures in a driver's cabin may be monitored and/or controlled, with the use of the one or several devices 160 for temperature monitoring and/or temperature control.

SUMMARY OF THE INVENTION

In the event of e.g. downhill slopes, or in situations where the vehicle must reduce its actual speed, fuel savings have historically been made through a reduced request of positive engine torque, or with the help of dragging. The reduced request of positive engine torque entails that the force driving in the direction of travel, emitted by the combustion engine via the driving wheels, is reduced, e.g. through reduced fuel injection into the engine 101, which reduces the fuel consumption.

Dragging means driving the vehicle with a closed powertrain, i.e. with the combustion engine connected to the vehicle's driving wheels, at the same time as the fuel injection to the combustion engine is closed. One advantage with this type of measure is, that since the fuel injection to the combustion engine is closed, the combustion engine's consumption is equal to zero. This measure does, however, also entail that the combustion engine will be driven by the vehicle's driving wheels via the powertrain, and so-called "dragging" is thus achieved, whereat the combustion engine's internal losses give rise to a braking action, i.e. engine braking of the vehicle.

A reduction of the requested engine torque and dragging does indeed reduce fuel consumption, but this reduction is not always optimal, because the reduced engine torque nevertheless often consumes more fuel than necessary, and because the dragging also adds an engine braking, which is not fuel economical, of the vehicle.

Coasting has been presented in order to further reduce the fuel consumption. Coasting entails, as described in more detail below, that the vehicle's engine is disconnected from the vehicle's driving wheels. This may also be described as opening of the powertrain. Disconnection of the driving wheels from the engine may, for example, be achieved by putting the gearbox in a neutral gear, or by opening the clutch. At coasting, the engine is only supplied with fuel for idling of the engine.

It is one objective of the present invention to further reduce the fuel consumption for the vehicle.

According to one aspect of the present invention a method to control preparatory measures for at least one system in a vehicle is provided, wherein such preparatory measures prepare one or several systems in the vehicle for an engine shutdown, as described below.

First, one or several parts of a road section are identified, during which parts one or several engines comprised in the vehicle may be shut down. Such identification is carried out when the road section is ahead of the vehicle, that is to say before the vehicle has entered the road section. The identification is based on available information about the road section.

Subsequently, it is determined whether at least one preparatory measure for at least one respective system in the vehicle needs to be carried out, in order to facilitate that one or several of the engines in the vehicle are shut down.

Subsequently, the preparatory measures are controlled based on the determination of the need to carry out the at least one preparatory measure.

By using the present invention the objective is achieved, that is to say the fuel consumption is reduced, by way of reliably ensuring that one or several of the vehicle's engines may be shut down during at least parts of a road section.

When the engine is shut down, additional fuel is saved compared to when, for example, coasting with an open powertrain is used, since no idling fuel is then consumed. In this document, a shutdown engine is defined as an engine which has zero engine speed; $\omega=0$. In a corresponding manner, an engine shutdown is defined as a measure that results in the engine speed after the measure becoming zero; $\omega=0$. In addition, coasting with a shutdown engine is considerably more advantageous for the exhaust treatment system than coasting while idling, since the exhaust treatment system retains the heat better with a shutdown engine, than when cooling air flows through the exhaust treatment system at idling. This more even temperature for the exhaust treatment system also contributes to a reduced fuel consumption, since so-called heating modes for the engine may then be avoided. At heating modes, fuel is used to actively heat a catalyst in the exhaust treatment system, which naturally contributes to the fuel consumption. When the engine is shut down, the exhaust treatment system retains heat better, so that the heating modes may thus be avoided.

In order to facilitate turning off the engine, various systems in the vehicle need to be prepared for the shutdown. For example, one or several compressors may need to be activated to ensure that a sufficient air pressure and/or that a sufficient hydraulic pressure is available in the vehicle, when the engine is shut down. The temperature of for example engines, brakes, catalysts and/or the driver's cabin may also need to be adjusted before the engine may be shut down, to provide a safe and/or comfortable progress of the vehicle when the engine has been shut down. Charging of one or several batteries in the vehicle may also be required before the engine is shut down.

In other words, for example one or several of the following conditions must be fulfilled before the engine shutdown:

an air pressure $P_{air\_brake}$ in one or several brake systems exceeds a pressure threshold value $P_{air\_brake\_th}$; $P_{air\_brake} > P_{air\_brake\_th}$;

an air pressure $P_{air\_act}$, which is used to actuate one or several devices in the vehicle, such as a gearbox, a clutch, an actuator at the engine for example for EGR and/or exhaust braking, or a level control system for the suspension, exceeds a pressure threshold value $P_{air\_act\_th}$; $P_{air\_act} > P_{air\_act\_th}$;

a charging status L for one or several batteries in the vehicle exceeds a charging value $L_{th}$; $L > L_{th}$;

an engine temperature $T_e$ is within an engine temperature interval $[T_{e\_min}, T_{e\_max}]$; $T_{e\_min} < T_e < T_{e\_max}$;

a catalyst temperature $T_c$ is within a catalyst temperature interval $[T_{c\_min}, T_{c\_max}]$; $T_{c\_min} < T_c < T_{c\_max}$;

a cabin temperature $T_h$ is within a cabin temperature interval $[T_{h\_min}, T_{h\_max}]$; $T_{h\_min} < T_h < T_{h\_max}$; and a powertrain status D indicates that a powertrain in the vehicle has an acceptable function.

The acceptable function of the powertrain status D may here mean, that no diagnostic system in the vehicle has discovered any error in any vital powertrain component, that is to say in any component which is important in driving the vehicle.

The present invention ensures that the preparation of necessary systems in the vehicle may be carried out based on well supported decisions, since the decisions are based on information about the road section ahead, during which the potential engine shutdowns will occur. Accordingly, a reliable preparation of the systems may be provided by the present invention.

The present invention may be implemented with little added complexity in the vehicle, since the invention may use data already available in other systems in the vehicle, such as information about the road section ahead, comprising for example road gradient, to which the cruise control in the vehicle already has access.

According to several embodiments of the present invention, one or several simulations of future speed profiles $v_{sim}$, for an actual speed of the vehicle may be carried out, which means that the system has very good control over how the vehicle will behave during the road section ahead of the vehicle. Based on these simulations, well-founded decisions relating to engine shutdowns may then be taken.

The present invention may be used both for pedal driving, i.e. when the driver regulates the torque demand from the engine, and for cruise control driving. The term pedal driving comprises, here and in this document, use of substantially all kinds of controls adapted to control torque request, such as, for example, an accelerator pedal or a hand gas device.

BRIEF DESCRIPTION OF THE DRAWINGS

The invention will be illustrated in more detail below, along with the enclosed drawings, where similar references are used for similar parts, and where.

DETAILED DESCRIPTION OF THE INVENTION

Figure 2:
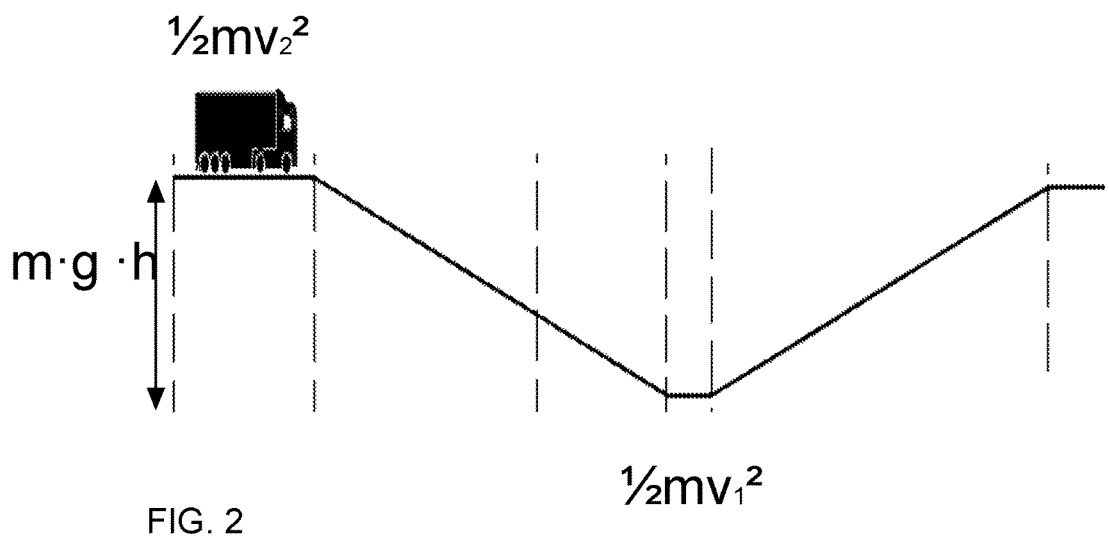
FIG. 2 schematically shows a driving situation.

FIG. 2 shows schematically a non-limiting example of a driving situation, a downhill slope, where the present invention may be applied. The invention may also be applied in other driving situations, for example at a speed reduction, which may occur on a flat road. However, the driving situation in FIG. 2 will here, for pedagogical reasons, be used to describe principles used by the invention.

For the vehicle in FIG. 2, an energy relationship may be set up for the driving situation:

$$mgh=(\tfrac{1}{2}mv_2^2-\tfrac{1}{2}mv_1^2)+(F_{air}+F_{rr}+F_{eng}+F_{gb}+F_{axle/nav})\cdot s \quad \text{(equation 1)}$$

where:
- mgh is the vehicle's potential energy;
- $\tfrac{1}{2}mv_2^2$ is the vehicle's kinetic energy up on the top of the hill;
- $\tfrac{1}{2}mv_1^2$ is the vehicle's kinetic energy at the end of the slope;
- $F_{air}$ is the vehicle's air resistance;
- $F_{rr}$ is the vehicle's rolling resistance;
- $F_{eng}$ is the engine friction;
- $F_{gb}$ is the gearbox friction;
- $F_{axle/nav}$ friction in the rear shaft, seals and wheel bearings; and
- s is the distance between the top of the hill and the end of the slope.

As illustrated by equation 1, a number of forces $F_{air}$, $F_{rr}$, $F_{eng}$, $F_{gb}$, and $F_{axle/nav}$ act against the vehicle's movements.

Figure 3:
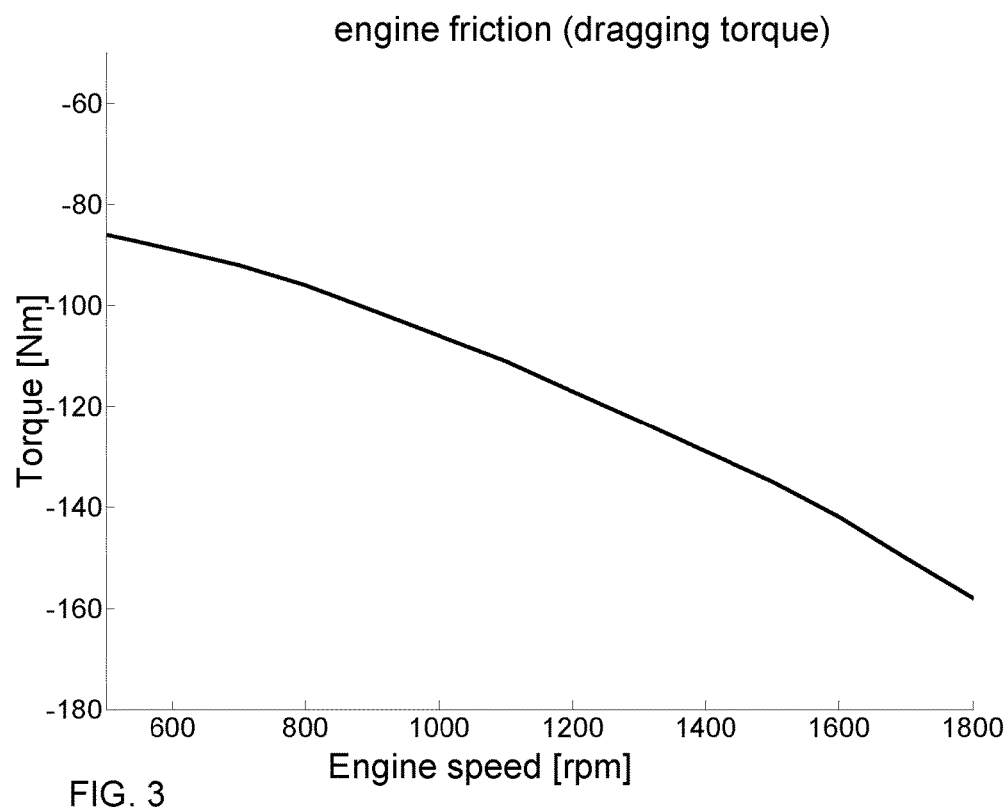
FIG. 3 shows a diagram of engine friction as a function of engine speed.

FIG. 3 shows an example of engine friction for a truck engine. Here it is shown that the negative torque, corresponding to the engine friction $F_{eng}$, which counteracts the movement of the vehicle, increases with an increased engine speed in the engine 101 (note that the y-axis has a negative gradation in FIG. 3). In the reverse, a reduced engine speed in the engine results in a reduced force for the engine friction $F_{eng}$, that is to say a reduced negative torque.

In this document, coasting means that the vehicle's engine 101 is disconnected from the vehicle's driving wheels 110, 111, i.e. that the powertrain is opened. This disconnection of the driving wheels 110, 111 from the engine 101, also called opening of the powertrain, may e.g. be achieved by putting the gearbox 103 in a neutral gear or by opening the clutch 106. In other words, substantially no power is transmitted from the engine 101 to the driving wheels 110, 110 [sic: 111] during coasting. Disconnection of one or several of the engines 101, 121 from the vehicle's 100 driving wheels 110, 111 when the vehicle 100 is moving is referred to in this document as coasting.

Coasting according to the present invention means that the forces acting against the vehicle's movement are significantly reduced, since the force of the engine friction $F_{eng}$ in this case decreases to a value substantially equal to zero (0). Therefore, coasting may significantly reduce fuel consumption through this reduction of the resistance against the vehicle.

This means, that from a fuel perspective it is often more advantageous to drive the vehicle with an open powertrain, i.e. by coasting, than with dragging, i.e. when the powertrain is closed while the fuel injection to the engine 101 is closed. The reason for this is that the limited amount of fuel required to keep the combustion engine in operation when the combustion engine is disconnected, is compensated for by the fact that the vehicle may continue with a disconnected combustion engine for a longer distance, e.g. after completing a downhill slope. This is due to, among others, the vehicle achieving a higher speed on e.g. the downhill slope when it is driven with a disconnected combustion engine, compared to when the vehicle is driven with a closed powertrain without fuel injection. At an engine shutdown used by the present invention no fuel at all is supplied to the engine.

In addition, when coasting, the force counteracting the vehicle being driven will be lower when the vehicle's combustion engine is disconnected from the driving shaft, since there is no engine braking force that counteracts the progress of the vehicle. This means that the vehicle will retard more slowly, e.g. when the vehicle reaches the end of a downhill slope, which in turn means that coasting may often be used over a relatively long distance, e.g. after the end of a downhill slope. Thus a significant reduction of fuel consumption is obtained.

The present invention is intended to further reduce fuel consumption at for example coasting, by way of turning off one or several of the engines in the vehicle if possible. When one or several engines are shut down, the fuel consumption decreases by the idling fuel which would have been required to operate the one or several engines if they had not been shut down, that is to say if they had been kept running, during the coasting.

Figure 4:
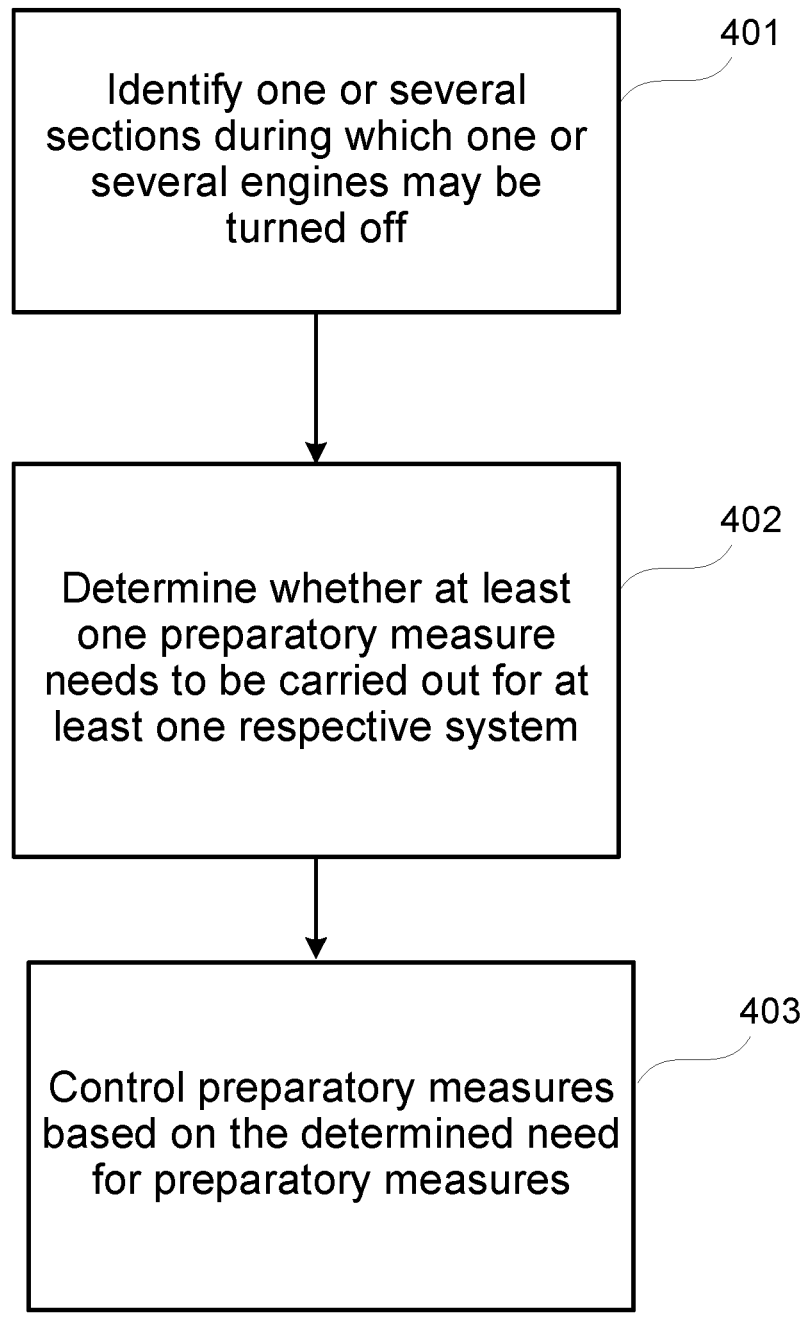
FIG. 4 shows a flow chart for the method according to the invention.

FIG. 4 shows a flow chart for the method according to the present invention. In a first step 401 of the method, one or several parts of a road section are identified, for example by using the identification unit 131 described below (FIG. 1), during which parts one or several motors comprised in the vehicle may be shut down. This identification 401 is carried out when the road section is ahead of the vehicle, that is to say before the vehicle has driven on to the road section. The identification is based on available information about the road section, for example containing map data and/or road gradients, as is described in further detail below.

In a second step 402, of the method, for example with the use of the first determination unit 132 described below (FIG. 1), if at least one preparatory measure for at least one respective system needs to be carried out, in order to shut down the one or several motors. In this case, according to different embodiments, amongst others the charging status of batteries, the temperatures of different systems in the vehicle, and/or the pneumatic or hydraulic pressure in the systems in the vehicle, may be analysed, in order to determine if preparatory measures need to be carried out or not.

In a third step 403 of the method, for example with the use of the second determination unit 133 described below (FIG. 1), the preparatory measures are subsequently controlled, based on the determination of the need to carry out the at least one preparatory measure.

Through this it is guaranteed that those systems in the vehicle needing preparation before the engine shutdown, really are prepared. Thus, here through a safe and comfortable driving of the vehicle is obtained, with one or several motors shut down.

In other words, the preparatory measures should result in one or several of the following requirements being met just before engine shutdown is desired:

a. an air pressure $P_{air\_brake}$ in one or several brake systems exceeds a pressure threshold value $P_{air\_brake\_th}$; $P_{air\_brake} > P_{air\_brake\_th}$;

b. an air pressure $P_{air\_act}$, which is used for the above described actuation of one or several devices in the vehicle exceeds a pressure threshold value $P_{air\_act\_th}$; $P_{air\_act} > P_{air\_act\_th}$;

c. a charging status L for one or several batteries in the vehicle exceeds a charging value $L_{th}$; $L > L_{th}$;

d. an engine temperature $T_e$ is within an engine temperature interval $[T_{e\_min}, T_{e\_max}]$; $T_{e\_min} < T_e < T_{e\_max}$;

e. a catalyst temperature $T_c$ is within a catalyst temperature interval $[T_{c\_min}, T_{c\_max}]$; $T_{c\_min} < T_c < T_{c\_max}$;

f. a cabin temperature $T_h$ is within a cabin temperature interval $[T_{h\_min}, T_{h\_max}]$; $T_{h\_min} < T_h < T_{h\_max}$; and g. a powertrain status D indicates that a powertrain in the vehicle has an acceptable function.

Figure 1:
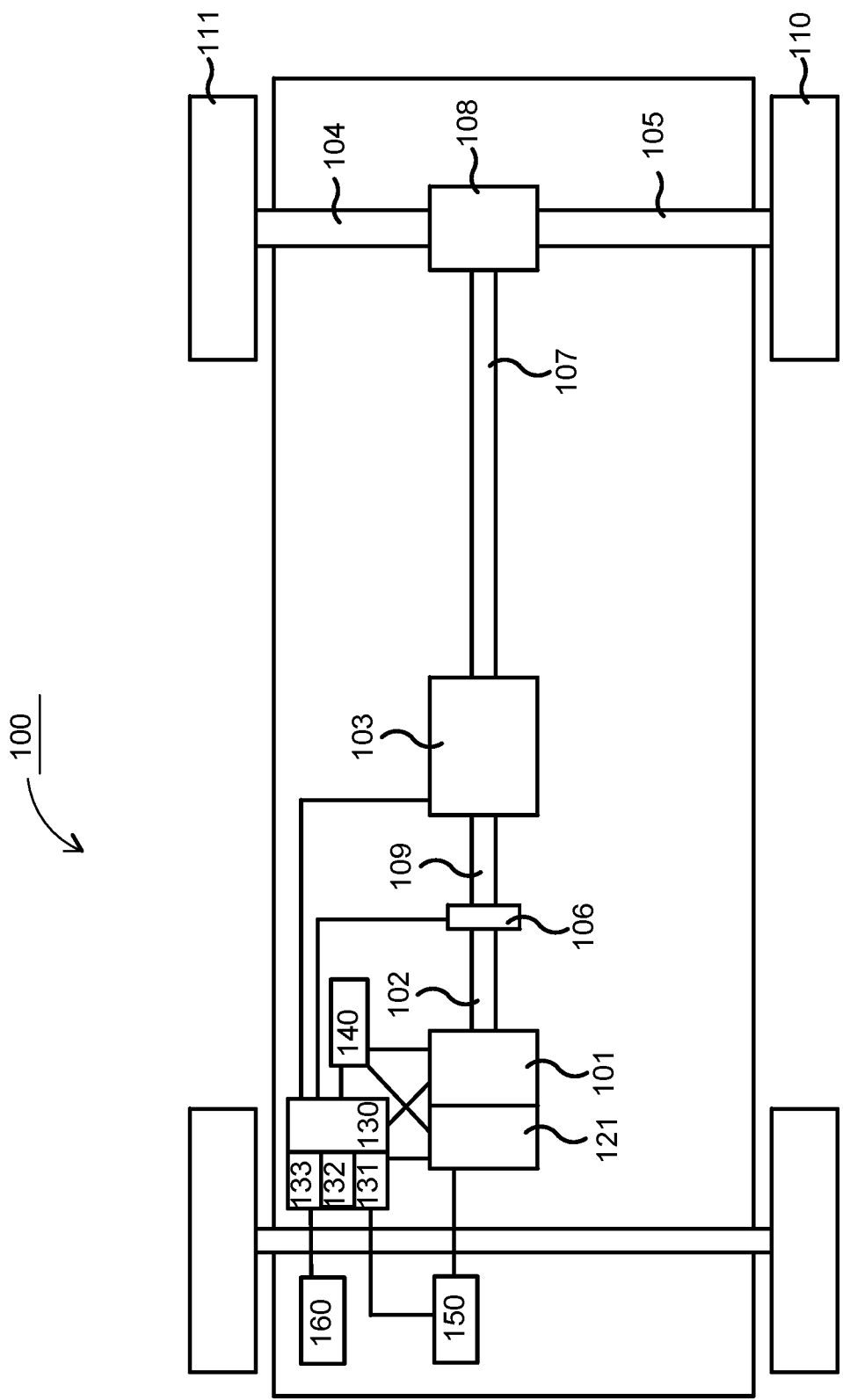
FIG. 1 shows a schematic view of an example vehicle.

The vehicle 100 displayed in FIG. 1 comprises, when the present invention is implemented in the vehicle, at least one control device 130, which may be arranged to control a number of different functions in the vehicle, such as among others the engines 101, 121, the clutch 106, the gearbox 103, the compressor 150, the charging of the one or several batteries with at least one charging device 140 and/or the temperature control devices 160.

As described in further detail below, the control device 130 in the system comprises, according to the present invention, the identification unit 131. The determination unit 132 and the preparation control unit 133.

Thus, according to one aspect of the present invention, a system is provided, which is arranged for control of preparatory measures during a road section, for at least one vehicle system 101, 121, 140, 150, 160.

The system comprises the identification unit 131, which is arranged to identify one or several parts during the road section, when one or several of the motors 101, 121 may be shut down. The identification unit 131 is here arranged to carry out the identification, when the road section is in front of the vehicle, whereat the identification is based on information about the road section ahead.

The system also comprises the determination unit 132, which is arranged for determination of if at least one preparatory measure for at least one respective system needs to be carried out, before the shutdown of the one or several engines 101, 121 is implemented.

The system also comprises the preparation control unit 133, which is arranged to control the preparatory measures, based on the determined need to carry out the at least one preparatory measure.

The system may also be arranged to perform each of the embodiments of the present invention described in this document, so that the system for the respective embodiments obtains the advantages for the respective embodiments described herein.

Here, and in this document, devices are often described as being arranged to carry out steps in the method according to the invention. This also comprises that the devices are adapted and/or set up to carry out these method steps.

As a person skilled in the art will realize, the control device 130 may also be arranged to control or communicate with one or several additional systems in the vehicle.

The at least one control device 130 is drawn in the figure as comprising separately marked units 131, 132, 133. These units 131, 132, 133, may also be logically separate, but physically implemented in the same unit, or may be both logically and physically jointly arranged/implemented. For example, these units 131, 132, 133 may correspond to different groups of instructions, for example in the form of program code, which is fed into, and used by a processor, when the respective unit carries out the respective corresponding method step.

The knowledge/information about the road section ahead may be obtained in a number of different ways. According to one embodiment of the invention, it is based on positioning information in combination with map data.

The information, comprising for example the road gradient and/or the curvature of the road section ahead may be determined based on map data, e.g. from digital maps comprising topographical information, in combination with positioning information, such as GPS information (Global Positioning System). With the help of positioning information the vehicle's relation to the map data may be determined, so that the information may be extracted from the map data.

In several cruise control systems today, map data and positioning information is used in the cruise control. Such systems may thus provide map data and positioning information to the system according to the present invention, which means that the added complexity for the determination of the information is very limited.

The knowledge/information may also be obtained based on radar information, on camera information, on information from another vehicle, on positioning information stored previously in the vehicle, and, for example, on road gradient and/or curvature information, or on information obtained from traffic systems related to the road section. In systems where information exchange between vehicles is used, information determined by one vehicle may also be provided to other vehicles, either directly or via an intermediate unit, such as a database or similar.

Obstacles in a future road section, for example in the form of junctions, traffic jams, accidents or similar, may also be identified and used as information about the road section, whereat that future deceleration may be estimated.

According to one embodiment of the present invention, the shutdown of one/several of the engines 101, 121 occurs while the vehicle is coasting, that is to say when there is an opening of a clutch 106 in the vehicle, and/or when a neutral gear is used in the gearbox 103 in the vehicle. In this document, the present invention is often described in relation to an engine shutdown, that is to say where an engine obtains zero engine speed; $\omega=0$; which occurs during coasting. For vehicles with more than one engine, one or several of these engines may be coasting. As an example, a hybrid powertrain may be configured in such a way that the combustion engine may be disconnected with the clutch 106, while the electric motor is arranged between the clutch 106 and the gearbox 103. Accordingly, in this configuration, the use of a neutral gear in the gearbox means that both the combustion engine and the electric motor are coasting, while an activation of the clutch means that only the combustion engine is coasting.

According to one embodiment of the present invention, the systems to be prepared for the engine shutdown comprise at least one compressor 150. Here, the determination of the need for preparatory measures comprises a comparison of a pressure P with a pressure threshold value $P_{th}$. The pressure P may here, for example, correspond to an air pressure $P_{air}$, whereat the pressure threshold value $P_{th}$ constitutes an air pressure threshold value $P_{air\_th}$. The pressure P may also correspond to a hydraulic pressure $P_{hyd}$ whereat the pressure threshold value $P_{th}$ constitutes a hydraulic pressure threshold value $P_{hyd\_th}$. The air pressure and/or hydraulic pressure may, for example, be used in the braking system or in the gear system, and in order to manoeuvre devices, such as for example valves, dampers, actuators or similar, in the vehicle.

The control of the preparatory measures here thus achieves that the compressor will be activated if the pressure P is lower than the pressure threshold value $P_{th}$; $P<P_{th}$. This ensures that an acceptable function will be obtained for vehicle systems, which use the compressed air and/or the hydraulic pressure during a future engine shutdown.

According to one embodiment of the present invention, the systems to be prepared for the engine shutdown comprise at least one battery charging device 140. The determination 402 of a need for preparatory measures, here comprises a comparison of a charging status L for one or several batteries in the vehicle with a charging threshold value $L_{th}$.

The control of the preparatory measures here achieves that the at least one device for battery charging 140 is activated, if the charging status L for the one or several batteries is below the charging threshold value $L_{th}$; $L<L_{th}$. This ensures that the batteries are sufficiently charged to operate an electric motor 121 in a hybrid vehicle, or to operate a starting engine, which is used to start the combustion engine 101 during an engine shutdown. It may also be ensured that the batteries are sufficiently charged to operate other electrically operated systems in the vehicle.

According to one embodiment of the present invention, the systems to be prepared for engine shutdown comprise at least one device for temperature control 160. The determination of the need for preparatory measures here comprises a comparison of a temperature T in the vehicle with a desired temperature interval $[T_{min}, T_{max}]$.

This temperature T may, for example, correspond to an engine temperature $T_e$, whereat the temperature interval consists of an engine temperature interval $[T_{e\_min}, T_{e\_max}]$. The temperature T may also correspond to a cabin temperature $T_h$, whereat the temperature interval consists of a cabin temperature interval $[T_{h\_min}, T_{h\_max}]$. The temperature T may also correspond to a catalyst temperature $T_c$ in an exhaust treatment system, whereat the temperature interval consists of a catalyst temperature interval $[T_{c\_min}, T_{c\_max}]$.

The control of the preparatory measures here comprises an activation of the at least one device for temperature control 160, if the temperature T is outside of the desired temperature interval $[T_{min}, T_{max}]$.

According to one embodiment, the identification in the method's first step 401 comprises a determination of a time period $T_{ICE\_on}$. The time period $T_{ICE\_on}$ here corresponds to a time period, during which the vehicle will be driven with the one or several engines 101, 121 running before they are shut down. In other words, the time period $T_{ICE\_on}$ is here determined from the point in time when the determination is carried out, that is to say when the method according to the present invention is carried out, until the point in time when it will be possible to turn off one or several engines.

A preparation time $T_{prep}$, required to carry out the respective at least one preparatory measure for each one of the relevant systems, which may potentially be prepared for the engine shutdown, is also determined.

The time period $T_{ICE\_on}$ during which the vehicle, before the engine shutdown, will be driven with the one or several engines 101, 121 running, is then compared with the at least one preparation time $T_{prep}$ required to carry out the respective at least one preparatory measure.

The identification 401 of one or several parts, during which one or several engines may be shut down, may then be based on the comparison of the time period $T_{ICE\_on}$ with the at least one preparation time $T_{prep}$, so that it may be concluded, for example, that the shutdown may be carried out if the time period $T_{ICE\_on}$ is longer than the preparation time $T_{prep}$ for important systems in the vehicle; $T_{ICE\_on} > T_{prep}$. Similarly, it may be concluded that a shutdown may not be carried out if the time period $T_{ICE\_on}$ is shorter than the preparation time $T_{prep}$ for important systems in the vehicle; $T_{prep} > T_{ICE\_on}$. By basing the identification of the parts where the engines may be shut down on the comparison of the time period $T_{ICE\_on}$ with the at least one preparation time $T_{prep}$, the risk that the engine shutdown may compromise the safety of and/or operation of the vehicle is avoided.

If it takes for example 20 seconds to fill the air tanks in the vehicle by activation of the compressor 150, and if it takes 1 minute to charge the batteries 140, the engine shutdown may be carried out in 30 seconds, $T_{ICE\_on}=30$ seconds, unless the charging status for the batteries is critically low, or is deemed critical for the vehicle's progress. This example assumes that it is crucial for the air pressure, which is used, for example, in the braking system, to be sufficiently high to guarantee the progress of the vehicle.

The control of the one or several preparatory measures before an engine shutdown may here also be based on the comparison of the time period $T_{ICE\_on}$ with the at least one preparation time $T_{prep}$ where for example preparatory measures with a shorter preparation time $T_{prep}$ than the time period $T_{ICE\_on}$; $T_{prep} < T_{ICE\_on}$; may be carried out, while the engines are running before the shutdown.

According to one embodiment of the present invention, the identification in the method's first step 401 comprises the performance of a simulation. Here, at least one future speed profile $v_{sim}$ for an actual speed $v_{act}$ of the vehicle is simulated during the road section ahead. The simulation is thus carried out on the road section ahead of the vehicle, and is based on the information about the road section ahead. Thus, one or several future speed profiles are simulated $v_{sim}$ for the vehicle's actual speed, wherein the simulation is carried out in such a manner that it is based on the vehicle's current position and situation and looks ahead over the road section, whereat the simulation is carried out, among others, based on the above described information about the road section.

Subsequently, an evaluation of whether one or several of the combustion engines 101, 121 may be shut down at least partly during the road section is carried out, whereat such evaluation is based at least on the at least one future speed profile $v_{sim}$. By basing the evaluation on the simulations and thus on the information about the road section, well supported and reliable decisions are obtained regarding the potential engine shutdowns.

For example, the simulation may be carried out in the vehicle with a predetermined frequency, such as for example with the frequency 1 Hz, which means that a new simulation result is ready every second. The road section for which the simulation is carried out comprises a predetermined distance ahead of the vehicle, which may for example be 1 km long. The road section may also be seen as a horizon, for which the simulation is carried out, in front of the vehicle.

The simulation may be based on one or several of a number of parameters, such as information about the road section, a used transmission mode in the vehicle, one or several of a driving style, a current actual vehicle speed, a vehicle weight, an air resistance, a rolling resistance, a gearing ratio in the gearbox and/or the powertrain, a wheel radius and/or at least one engine property, such as a maximum and/or a minimum engine torque.

The information about the road section may comprise, among others, the road gradient α. The road gradient α may be obtained in a number of different ways. The road gradient α may be determined based on map data, e.g. from digital maps comprising topographical information, in combination with positioning information, such as GPS information (Global Positioning System). With the help of positioning information the vehicle's position in relation to the map data may be determined, so that the road gradient α may be extracted from the map data.

In several cruise control systems today, map data and positioning information is used in the cruise control. Such systems may thus provide map data and positioning information to the system according to the present invention, which means that the added complexity for the determination of the road gradient α is minimized.

The road gradient α on which the simulations are based, may be obtained by way of estimating the road gradient experienced by the vehicle at the time of simulation. There are many ways of estimating this road gradient α, e.g. based on an engine torque in the vehicle, on an acceleration of the vehicle, on an accelerometer, on GPS information, on radar information, on camera information, on information from another vehicle, on positioning-related and road gradient information stored previously in the vehicle, and/or on information obtained from traffic systems related to said road section. In systems where information exchange between vehicles is used, the road gradient estimated by a vehicle may also be provided to other vehicles, either directly or via an intermediate unit, such as a database or similar.

According to one embodiment of the present invention, the road gradient is used more generally, that is to say that the use of the road gradient is not limited to the above mentioned simulations. According to this embodiment, the road gradient α, which is comprised in the information about the road section ahead and may be obtained as described above, is analysed.

Subsequently, an evaluation of whether any of the one or several engines 101, 121 may be shut down at least partly during the road section is carried out. Such evaluation of the shutdown is based at least on the analysis of the road gradient α.

Subsequently, based on the analysis of the road gradient α, a time period $T_{ICE\_on}$ is determined, during which the vehicle will be driven with the one or several engines 101, 121 running before the shutdown may take place. As described above, the time period $T_{ICE\_on}$ may then, for example, be compared with at least one preparation time $T_{prep}$ which is required to carry out the respective at least one preparatory measure for the various systems, following which identification of possible shutdowns 401 and/or control 403 of the preparatory measures may be based on the comparison.

According to one embodiment of the present invention, the identification according to the method's first step 401 of one or several parts, comprises, when any of the one or several engines 101, 121 may be shut down, an analysis of a driving force requirement $F_{driv}$ for the vehicle 100 during the road section. For example, the driving force requirements $F_{driv}$ may be calculated as the sum of the rolling resistance $F_{roll}$, the air resistance $F_{air}$ and the force of gravity $F_{grav}$, $F_{driv}=F_{roll}+F_{air}+F_{grav}$; over the road section. The driving force requirements $F_{driv}$ may be calculated at a number of points in time, whereat such individually calculated values, or an average value for these calculated values, may be used at a subsequent evaluation.

Subsequently, an evaluation of whether the engine shutdown may at least partly occur during the road section is thus carried out, whereat the evaluation is based at least on the analysis of the driving force requirements $F_{driv}$. For example, calculated values for the driving force requirements $F_{driv}$, or an average value for these calculated values, may be compared with a driving force threshold value $F_{driv\_thr}$ whereat an engine shutdown may take place if the driving force requirements $F_{driv}$, or its average value, is lower than the threshold value; $F_{driv}<F_{driv\_th}$. Subsequently, based on the analysis of the driving force requirement $F_{driv}$, a time period $T_{ICE\_on}$, during which the vehicle will be driven with the one or several engines running before the engine shutdown, is determined. As described above, the time period $T_{ICE\_on}$ may then, for example, be compared with at least one preparation time $T_{prep}$, which is required to carry out the respective at least one preparatory measure for the various systems, following which identification of possible shutdowns 401 and/or control 403 of the preparatory measures may be based on the comparison.

According to one embodiment of the present invention, the simulations of the at least one future speed profile $v_{sim}$ comprises at least two different simulations $v_{sim\_1}$, $v_{sim\_2}$, whereat each one of such at least two simulations $v_{sim\_1}$, $v_{sim\_2}$ is based on a preparatory time $T_{prep\_1}$, $T_{prep\_2}$ for one of the systems 101, 121, 140, 150, 160, which may need to be prepared for engine shutdown. Thus, consideration may be had to the preparatory time periods $T_{prep\_1}$, $T_{prep\_2}$ for the respective systems also during simulations, whereat a simulation $v_{sim\_1}$, $v_{sim\_2}$ for each one of the relevant systems is carried out. This means that well founded decisions may be made, based on detailed information for each one of the relevant systems 101, 121, 140, 150, 160, wherein the information comprises an indication as to whether or not there is time for the respective systems to be prepared before the engine shutdown.

The at least one future speed profile $v_{sim}$ may be prepared by way of simulation of cruise control of the actual speed $v_{act}$ during at least one preparation time period $T_{prep\_1}$, $T_{prep\_2}$, followed by a simulation of coasting. Thurs, here it is simulated that the vehicle is first driven with the use of a cruise control, and that the vehicle is coasting after the cruise control regulation. Subsequently, an evaluation of whether one or several of the combustion engines 101, 121 may be shut down at least partly during the road section is carried out, whereat such evaluation is based at least on the at least one future speed profile $v_{sim}$. By basing the evaluation on the simulations and thus on the information about the road section, well supported and reliable decisions are obtained regarding the potential engine shutdowns.

Figure 5:
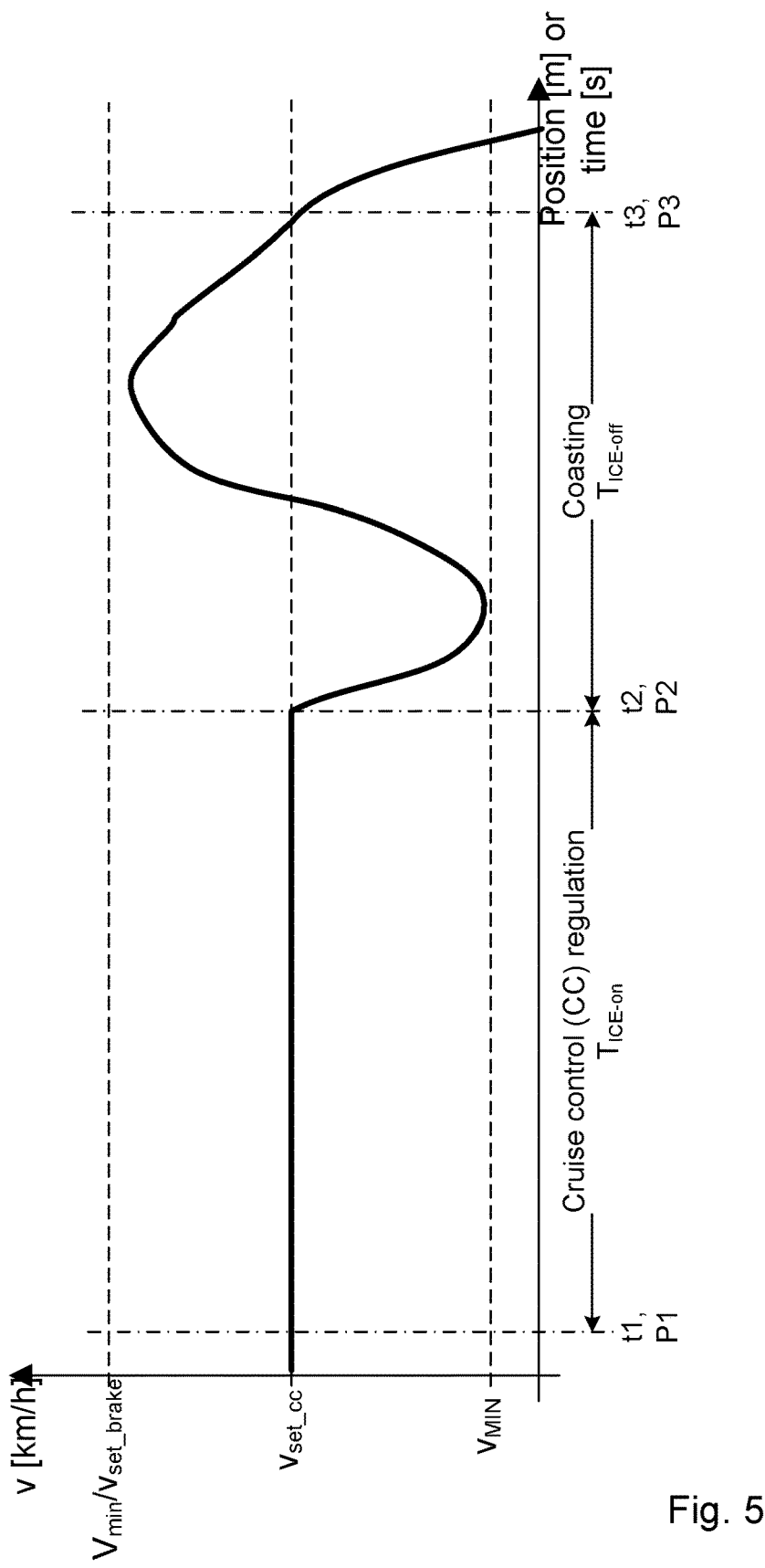
FIG. 5 shows an example of a simulation according to the invention.

This embodiment is illustrated in an example in FIG. 5. Here, the method starts at a first point in time t1, corresponding to a first position P1. The at least one future speed profile $v_{sim}$, here thus simulates the cruise control regulation of the actual speed $v_{acct}$ during an initial time period $T_{ICE\_on}$ with the engines running, which is indicated in the figure with "normal CC-driving", and extends from the first point in time t1 to a second point in time t2, corresponding to a second position P2; $T_{ICE\_on}=t2-t1$. After the time period $T_{ICE\_on}$ with the engines running, coasting is simulated during a final time period between the second point in time t2 and a third point in time t3, corresponding to a third position P3. Thus, here it is simulated that the vehicle is first driven with the use of a cruise control, and that the vehicle is coasting subsequently.

An evaluation of whether any of the one or several engines 101, 121 may be shut down at least partly during the road section in the example, is based on the simulated speed profile $v_{sim}$. Shutdown of engines requires that the important system conditions described above are fulfilled, in order to ensure a comfortable and safe progress with the vehicle. With the use of the embodiment an analysis may be carried out, as to whether the system conditions have been met and/or will be met before the engine shutdown should begin.

As described above, potentially one or several systems in the vehicle will need to be prepared for the shutdown. For example, one or several compressors may need to be activated to ensure that a sufficient air pressure or hydraulic pressure is available in the vehicle when the engine is shut down. Temperatures of for example engines, brakes, catalysts and/or the driver's cabin may also need to be adjusted before the engine may be shut down, in order to ensure a safe and/or comfortable progress of the vehicle when the engine has been shut down. Charging of one or several batteries may also be necessary before the engine is shut down. This may, in this example, be carried out during the preparatory time period, which here coincides with the period for normal cruise control driving $T_{prep}=t2-t1=T_{ICE\_on}$.

Thus, the system may here, for example, conclude that some of the system conditions have been met already at the first point in time t1, when the method is carried out. The system may also, for example, conclude that one or several of the system conditions are not fulfilled at the first point in time t1, but that these will be fulfilled at the second point in time t2 when coasting will begin, if some of the systems are prepared for the engine shutdown during the preparatory time period $T_{prep}=t2-t1$.

In the example in FIG. 5, all substantial system conditions will thus be fulfilled at the second point in time t2, so that the engine shutdown $T_{ICE\_off}$ will be feasible while the vehicle is coasting. Thus, an additional reduction of the fuel consumption will be provided during the coasting, since no coasting fuel is consumed when the engine is shut down.

According to several embodiments of the invention, the vehicle is coasting in connection with the engine shutdown. A determination of whether coasting is applicable or not may, for example, be based on the one or several simulated future speed profiles $v_{sim}$, and one or several of a minimum permitted speed $v_{min}$, below which the vehicle should not fall, and a maximum permitted speed $v_{max}$ which an actual speed of the vehicle 100 should not exceed. By comparing the simulated future speed profiles $v_{sim}$ with these maximum and/or minimum permitted speeds, a controlled coasting may be achieved.

At coasting, a very fuel efficient driving of the vehicle may be achieved with the use of an open clutch or neutral gear, if this is suitable for road sections ahead of the vehicle.

The size of the minimum permitted speed $v_{min}$, that is to say the level of the minimum permitted speed $v_{min}$, is, according to one embodiment, related to a current actual speed $v_{act}$ of the vehicle. The size of the maximum permitted speed $v_{max}$ is, according to one embodiment, related to a constant speed braking speed $_{dhsc}$ for the vehicle.

The minimum permitted speed $v_{min}$ and/or the maximum permitted speed $v_{max}$ may be altered dynamically, and may have different values for different transmission modes.

The size of the minimum permitted speed $v_{min}$ may, according to one embodiment, be determined at least partly based on information related to a cruise control system in the vehicle, for example based on a set speed $v_{set}$, that is to say a driver selected speed, for a cruise control system, or based on a reference speed $v_{ref}$, which is used by the cruise control system to control a speed governor. The determination of the minimum permitted speed $v_{min}$ may also be carried out by the cruise control system, and be provided to the system according to the present invention.

According to one embodiment of the present invention, the system according to the present invention is integrated, at least partly, with cruise control logic in a cruise control system in the vehicle. The minimum permitted speed $v_{min}$ may then be controlled by the vehicle's cruise control logic. For example, an intelligent cruise control reduces the vehicle speed before downhill slopes, since the vehicle will accelerate anyway during the downhill slope. According to this embodiment the cruise control may also initiate a reduction of the minimum permitted speed $v_{min}$, and thus extend the period of coasting and/or of the highest possible gear for the vehicle. This reduction of the minimum permitted speed $v_{min}$ may, for example, be achieved if the minimum permitted speed $v_{min}$ is related to the reference speed $v_{ref}$, which is the setpoint value that is reduced by the cruise control before the downhill slope, so that the control of the minimum permitted speed $v_{min}$ is achieved automatically. For example, the minimum permitted speed $v_{min}$ may constitute a percentage of the reference speed $v_{ref}$.

Generally, the speed threshold values used by the present invention, that is to say the minimum permitted speed $v_{min}$ and the maximum permitted speed $v_{max}$, may be determined in numerous different ways. For example, the driver may set these threshold values, they may constitute a percentage of an actual speed $v_{act}$ of the vehicle, they may constitute a percentage of a set speed $v_{set}$ for the cruise control system in the vehicle and/or they may be based on historic driving of the vehicle. Historic driving may be considered, for example, via the use of an adaptive algorithm, which is updated during the vehicle's progress.

As a non-limiting example, the following values could be used for the speed threshold values in this document:

$v_{min}$=82 km/h or $v_{min}$=0.98*$v_{set}$ km/h; and $v_{max}$=90 km/h or $v_{max}$=1.06*$v_{set}$ km/h, or $v_{max}$=0.995*$v_{dhsc}$ km/h.

As described above, the road gradient may be determined based on map data and positioning information. If such data is not available, the simulations may be based on estimates of the road gradient experienced by the vehicle at the time of simulation. This places greater requirements on the size for the minimum permitted speed $v_{min}$ and/or the maximum permitted speed $v_{max}$ since the simulations becomes less accurate and more varying in size. In addition the length of the horizon, that is to say the road section, according to one embodiment of the invention, may be shortened to prevent such variations.

Where the road gradient for the road section is approximated with the road gradient experienced by the vehicle at the simulation itself, the best result will be obtained at a slight downhill slope. Slight downhill slopes are ideal for coasting if, for example, the road gradient is such that the simulated speed $v_{sim}$ is within its permitted interval, between the minimum permitted speed $v_{min}$ and the maximum permitted speed $v_{max}$.

One advantage with simulating future speed profiles based on the current gradient, is that the same algorithm may be used for both roads and vehicles when there is no access to the future road gradient, as well as for roads and vehicles when there is access to the future road gradient. In addition, the simulation uses speed dependent terms, such as e.g. air resistance and engine torque, so that a good estimate of how the vehicle will behave in the future is obtained, even without any knowledge about the future road gradient.

A person skilled in the art will realize that a method for control of preparatory measures during a road section, for at least one system according to the present invention, may also be implemented in a computer program, which when executed in a computer will cause the computer to carry out the method. The computer program usually consists of a computer program product 603 stored on a digital storage medium, where the computer program is comprised in the computer program products' computer readable medium. Said computer readable medium consists of a suitable memory, e.g.: ROM (Read-Only Memory), PROM (Programmable Read-Only Memory), EPROM (Erasable PROM), Flash, EEPROM (Electrically Erasable PROM), a hard disk device, etc.

Figure 6:
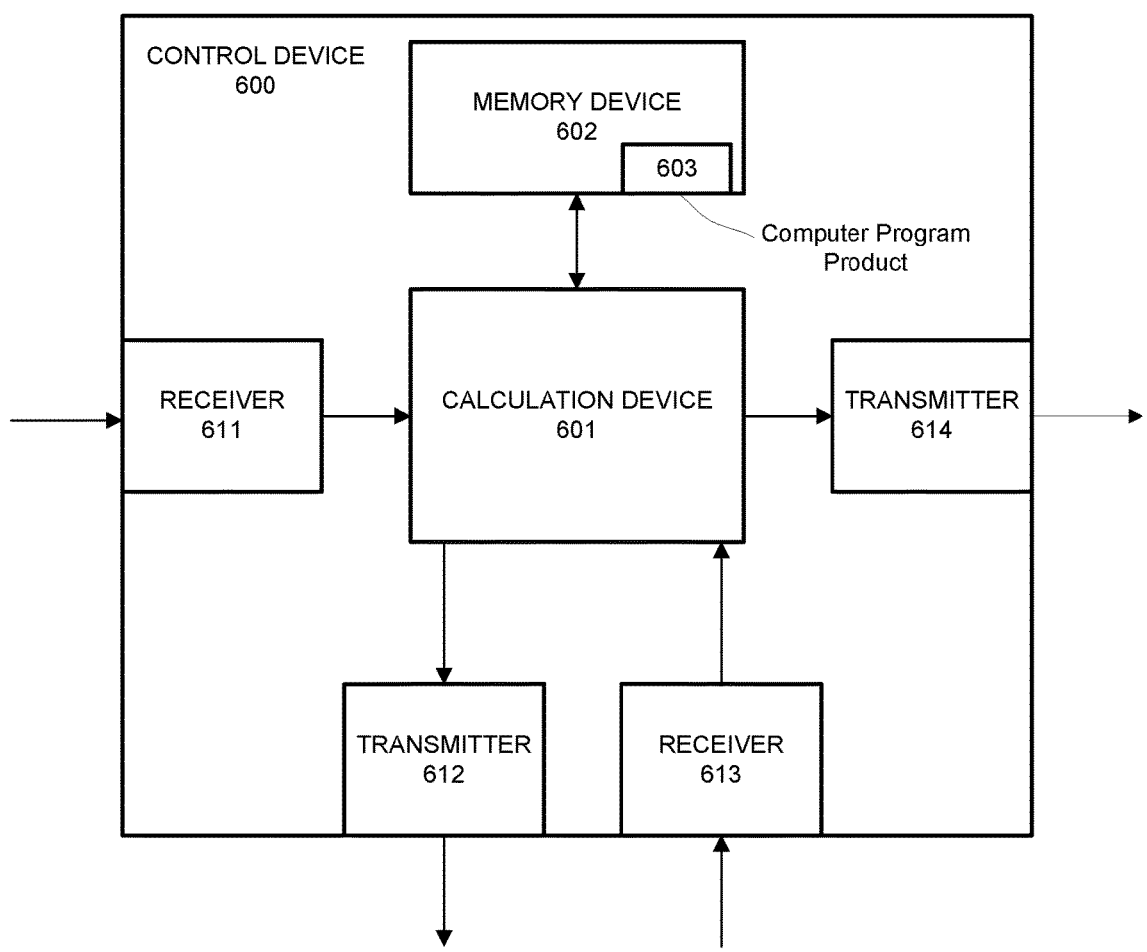
FIG. 6 shows a control device, in which the present invention may be implemented.

FIG. 6 schematically shows a control device 600. The control device 600 comprises a calculation device 601, which may consist of substantially any suitable type of processor or microcomputer, e.g. a circuit for digital signal processing (Digital Signal Processor, DSP), or a circuit with a predetermined specific function (Application Specific Integrated Circuit, ASIC). The calculation device 601 is connected to a memory unit 602 installed in the control device 600, providing the calculation device 601 with e.g. the stored program code and/or the stored data, which the calculation device 601 needs in order to be able to carry out calculations. The calculation unit 601 is also set up to store interim or final results of calculations in the memory unit 602.

Further, the control device 600 is equipped with devices 611, 612, 613, 614 for receipt and sending of input and output signals, respectively. These input and output signals may contain wave shapes, pulses, or other attributes, which may be detected as information by the devices 611, 613 for the receipt of input signals, and may be converted into signals that may be processed by the calculation device 601. These signals are then provided to the calculation device 601. The devices 612, 614 for sending of output signals are arranged to transform signals received from the calculation device 601 for the creation of output signals by e.g. modulating the signals, which may be transmitted to other parts of and/or systems in the vehicle.

Each one of the connections to the devices for receiving and sending of input and output signals may consist of one or several of a cable; a data bus, such as a CAN (Controller Area Network) bus, a MOST (Media Oriented Systems Transport) bus, or any other bus configuration; or of a wireless connection. A person skilled in the art will realized that the above-mentioned computer may consist of the calculation device 601, and that the above-mentioned memory may consist of the memory unit 602.

Generally, control systems in modern vehicles consist of a communications bus system, consisting of one or several communications buses to connect a number of electronic control devices (ECUs), or controllers, and different components localized on the vehicle. Such a control system may comprise a large number of control devices, and the responsibility for a specific function may be distributed among more than one control device. Vehicles of the type shown, thus often comprise significantly more control devices than what is shown in FIG. 6, which is well known to a person skilled in the art within the technology area.

The present invention, in the embodiment displayed, is implemented in the control device 600. The invention may also be implemented wholly or partly in one or several other control devices already existing in the vehicle or in a control device dedicated to the present invention.

A person skilled in the art will obviously realize that speeds and speed threshold values which are specified in this document have equivalents and may be translated into engine speed and engine speed thresholds or torque and torque threshold values. Likewise, a person skilled in the art will realize that there is a very well-known correlation between distances, times and speeds, so that the times and time periods specified herein have equivalents in positions and distances.

A person skilled in the art will also realize that the above system may be modified according to the different embodiments of the method according to the invention. In addition the invention relates to a motor vehicle 100, for example a truck or a bus, comprising at least one system for control of preparatory measures during a road section according to the invention.

The present invention is not limited to the embodiments of the invention described above, but relates to and comprises all embodiments within the protected scope of the enclosed independent claims.

The invention claimed is:

1. A method for control of preparatory measures associated with entering a part of a road section for at least one system in a vehicle, said method comprising:
    identification of one or several parts of a road section, when one or several engines comprised in said vehicle may be shut down while said vehicle is coasting in said road section, wherein said identification of said part of the road section is carried out when said part of the road section is ahead of said vehicle, and wherein said identification is based on information about said part of the road section, wherein said information about said road section is determined based on information from one or more sources selected from the group of:
    map data in combination with positioning information;
    positioning information stored previously in the vehicle;
    radar-based information;
    camera-based information;
    information obtained from another vehicle than said vehicle; and
    information obtained from traffic systems relating to said road section;
    determination of whether at least one preparatory measure for at least one respective system needs to be carried out before entering the road section where shutdown of said one or several engines occurs, wherein at least one of a charging status of batteries, temperatures of different systems in the vehicle, or pneumatic or hydraulic pressure in systems in the vehicle is analyzed to determine if at least one preparatory measure needs to be carried out or not before entering the road section; and
    control of said at least one preparatory measure initiated before entering the road section, based on said determination of the need to carry out said at least one preparatory measure, so that the one or several engines comprised in said vehicle may be shut down, while said vehicle is coasting in said road section.

2. A method according to claim 1, wherein
    said at least one system comprises at least one compressor;
    said determination comprises a comparison of a pressure P with a pressure threshold value $R_{th}$; and
    said control comprises an activation of said at least one compressor, if said pressure P is lower than said pressure threshold value $R_{th}$; $P<P_{th}$.

3. A method according to claim 2, wherein said pressure P corresponds to one among the group of:
    an air pressure $P_{air}$, wherein said pressure threshold value $P_{th}$ is an air pressure threshold value $P_{air\_th}$; or
    a hydraulic pressure $P_{hyd}$, wherein said pressure threshold value $P_{th}$ is a hydraulic pressure threshold value $P_{hyd\_th}$.

4. A method according to claim 1, wherein:
    said at least one system comprises at least one battery charging device;
    said determination comprises a comparison of a charging status L for one or several batteries in said vehicle with a charging threshold value $L_{th}$; and
    said control comprises an activation of said at least one battery charging device, if said charging status L is greater than said charging threshold value $L_{th}$; $L<L_{th}$.

5. A method according to claim 1, wherein:
said at least one system comprises at least one temperature control device;
said determination comprises a comparison of a temperature T in said vehicle with a temperature interval $[T_{min}, T_{max}]$; and
said control comprises activation of said at least one temperature control device, if said temperature T is outside of said temperature interval $[T_{min}, T_{max}]$.

6. A method according to claim 5, wherein said temperature T corresponds to one among the group of:
an engine temperature $T_e$, whereat said temperature interval is an engine temperature interval $[T_{e\_min}, T_{e\_max}]$;
a cabin temperature $T_h$, whereat said temperature interval is a cabin temperature interval $[T_{h\_min}, T_{h\_max}]$; or
a catalyst temperature $T_c$, whereat said temperature interval is a catalyst temperature interval $[T_{c\_min}, T_{c\_max}]$.

7. A method according to claim 1, wherein said identification of one or several parts where said one or more engines may be shut down comprises a determination of a time period $T_{ICE\_on}$, during which said vehicle will be driven with said one or several engines running, before said one or several engines will be shut down.

8. A method according to claim 7, wherein:
said time period $T_{ICE\_on}$, during which said vehicle will be driven with said one or more engines running, is compared with at least one preparation time $T_{prep}$ required to carry out the respective at least one preparatory measure; and
said identification and/or said control of said preparatory measures is based on said comparison.

9. A method according to claim 1, wherein said identification of one or several parts where one or several engines may be shut down comprises:
simulation of at least one future speed profile $v_{sim}$ for an actual speed $v_{ast}$ of said vehicle during said road section, wherein said simulation is carried out when said road section is ahead of said vehicle and wherein said simulation of each one of said at least one future speed profile $v_{sim}$ is based on said information about said road section; and
evaluation of whether said one or several engines may be shut down at least partly during said road section, wherein said evaluation of the shutdown of said one or more engines is based at least on said at least one future speed profile $v_{sim}$.

10. A method for control of preparatory measures associated with entering a part of a road section for at least one system in a vehicle, said method comprising:
identification of one or several parts of a road section, when one or several engines comprised in said vehicle may be shut down while said vehicle is coasting in said road section, wherein said identification of said part of the road section is carried out when said part of the road section is ahead of said vehicle, and wherein said identification is based on information about said part of the road section, wherein said identification of one or several parts where said one or several engines may be shut down comprises:
analysis of a road gradient α comprised in said information about said road section;
evaluation of whether said one or more engines may be shut down at least partly during said road section, wherein said evaluation of the shutdown is based at least on said analysis of said road gradient α; and
determination, based on said analysis of said road gradient α, of a time period $T_{ICE\_on}$, during which said vehicle will be driven with said one or more engines running, before said one or several engines will be shut down;
determination of whether at least one preparatory measure for at least one respective system needs to be carried out before entering the road section where shutdown of said one or several engines occurs, wherein at least one of a charging status of batteries, temperatures of different systems in the vehicle, or pneumatic or hydraulic pressure in systems in the vehicle is analyzed to determine if at least one preparatory measure needs to be carried out or not before entering the road section; and
control of said at least one preparatory measure initiated before entering the road section, based on said determination of the need to carry out said at least one preparatory measure, so that the one or several engines comprised in said vehicle may be shut down, while said vehicle is coasting in said road section.

11. A method according to claim 1, wherein said identification of one or several parts where said one or several engines may be shut down comprises:
analysis of a driving force requirements $F_{driv}$ during said road section;
evaluation of whether said one or several engines may be shut down at least partly during said road section, wherein said evaluation of the shutdown is based at least on said analysis of said driving force requirements $F_{driv}$; and
determination, based on said analysis of said driving force requirement $F_{driv}$, of a time period $T_{ICE\_on}$, during which said vehicle will be driven with said one or more engines running, before said one or more engines will be shut down.

12. A method according to claim 9, wherein said at least one future speed profile $v_{sim}$ comprises at least two different simulations $v_{sim\_1}$, $v_{sim\_2}$, wherein each one of such at least two simulations $v_{sim\_1}$, $v_{sim\_2}$ is based on a preparatory time $T_{prep\_1}$, $T_{prep\_2}$ for one of the systems.

13. A method according to claim 9, wherein said at least one future speed profile $v_{sim}$ comprises:
a simulation of a cruise control regulation of said actual speed vast during at least one preparation time period $T_{prep\_1}$, $T_{prep\_2}$; and
a simulation of coasting, wherein said coasting follows after the cruise control regulation.

14. A method according to claim 1, wherein said information about said road section is provided by a cruise control system, which uses map data and positioning information at cruise control.

15. A method according to claim 1, wherein said coasting is achieved by way of one or several from among the group:
an opening of a clutch in said vehicle; or
a shift operation to a neutral gear in a gearbox in said vehicle.

16. A computer program product comprising computer program code stored on a non-transitory computer-readable medium readable by a computer, said computer program product used for control of preparatory measures associated with entering a part of road section for at least one system in a vehicle, said computer program code comprising computer instructions to cause one or more computer processors to perform the operations of:
identification of one or several parts of a road section, when one or several engines comprised in said vehicle may be shut down while said vehicle is coasting in said road section, wherein said identification of said part of the road section is carried out when said part of the road section is ahead of said vehicle, and wherein said identification is based on information about said part of the road section, wherein said information about said road section is determined based on information from one or more sources selected from the group of:

map data in combination with positioning information;

positioning information stored previously in the vehicle;

radar-based information;

camera-based information;

information obtained from another vehicle than said vehicle; and information obtained from traffic systems relating to said road section;

determination of whether at least one preparatory measure for at least one respective system needs to be carried out before entering the road section where shutdown of said one or several engines occurs, wherein at least one of a charging status of batteries, temperatures of different systems in the vehicle, or pneumatic or hydraulic pressure in systems in the vehicle is analyzed to determine if at least one preparatory measure needs to be carried out or not before entering the road section; and control of said at least one preparatory measure initiated before entering the road section, based on said determination of the need to carry out said at least one preparatory measure, so that the one or several engines comprised in said vehicle may be shut down, while said vehicle is coasting in said road section.

17. A system arranged for control of preparatory measures associated with entering a part of a road section for at least one system in a vehicle, said system comprising:

an identification unit, arranged for identification of one or several parts of a road section, when one or several engines comprised in said vehicle may be shut down while said vehicle is coasting in said road section, wherein said identification of said part of the road section is carried out when said part of the road section is ahead of said vehicle, and wherein said identification is based on information about said part of the road section, wherein said information about said road section is determined based on information from one or more sources selected from the group of:

map data in combination with positioning information;

positioning information stored previously in the vehicle;

radar-based information;

camera-based information;

information obtained from another vehicle than said vehicle; and information obtained from traffic systems relating to said road section;

a determination unit, arranged for determination of whether at least one preparatory measure for at least one respective system needs to be carried out before entering the road section where shutdown of said one or several engines occurs, wherein at least one of a charging status of batteries, temperatures of different systems in the vehicle, or pneumatic or hydraulic pressure in systems in the vehicle is analyzed to determine if at least one preparatory measure needs to be carried out or not before entering the road section; and a preparation control unit, arranged for control of said at least one preparatory measure initiated before entering the road section, based on said determination of the need to carry out said at least one preparatory measure, so that the one or several engines comprised in said vehicle may be shut down, while said vehicle is coasting in said road section.

* * * * *

UNITED STATES PATENT AND TRADEMARK OFFICE
CERTIFICATE OF CORRECTION

PATENT NO. : 10,495,013 B2
APPLICATION NO. : 15/320962
DATED : December 3, 2019
INVENTOR(S) : Fredrik Roos, Mikael Ögren and Olof Larsson Page 1 of 1

It is certified that error appears in the above-identified patent and that said Letters Patent is hereby corrected as shown below:

In the Claims

In Column 16, Claim 2, please change Line 49 to:
P with a pressure threshold value $P_{th}$ ; and In Column 16, Claim 2, please change Line 52 to:
sure threshold value $P_{th}$; $P<P_{th}$.

In Column 17, Claim 9, please change Line 36 to:
actual speed $V_{act}$ of said vehicle during said road In Column 18, Claim 13, please change Line 42 to:
speed $V_{act}$ during at least one preparation time period Signed and Sealed this
Eleventh Day of February, 2020

Andrei Iancu
*Director of the United States Patent and Trademark Office*